United States Patent [19]
Kalamkarov et al.

[11] Patent Number: 6,061,902
[45] Date of Patent: May 16, 2000

[54] METHOD FOR RECOVERING LEADS EMBEDDED WITHIN A COMPOSITE STRUCTURE

[75] Inventors: Alexander L. Kalamkarov; Stephen Bruce Fitzgerald, both of Halifax, Canada

[73] Assignee: Dalhousie University, Nova Scotia, Canada

[21] Appl. No.: 09/063,932

[22] Filed: Apr. 21, 1998

[51] Int. Cl.$^7$ .................................................. H01R 43/00
[52] U.S. Cl. ............................. 29/825; 29/33 M; 81/9.51
[58] Field of Search ............................ 29/825, 827, 828, 29/33 M; 81/9.51

[56] References Cited

U.S. PATENT DOCUMENTS

| | | |
|---|---|---|
| T101,401 | 1/1982 | Zion . |
| 3,621,560 | 11/1971 | Le Bright . |
| 3,845,552 | 11/1974 | Waltz . |
| 4,168,194 | 9/1979 | Stiles . |
| 4,172,106 | 10/1979 | Lewis . |
| 4,305,770 | 12/1981 | Stiles . |
| 4,347,287 | 8/1982 | Lewis et al. . |
| 4,481,380 | 11/1984 | Wood et al. . |
| 4,598,457 | 7/1986 | Kiwak et al. . |
| 4,620,401 | 11/1986 | L'Esperance et al. . |
| 4,634,217 | 1/1987 | Levacher et al. . |
| 4,719,697 | 1/1988 | Schwartzman et al. . |
| 4,752,313 | 6/1988 | Allaire et al. . |
| 4,763,982 | 8/1988 | Greveling . |
| 4,840,452 | 6/1989 | Federmann et al. . |
| 4,851,165 | 7/1989 | Rennell, Jr. et al. . |
| 4,886,562 | 12/1989 | Pinson . |
| 4,956,039 | 9/1990 | Olesen et al. . |
| 4,978,564 | 12/1990 | Douglas . |

(List continued on next page.)

FOREIGN PATENT DOCUMENTS

| | | |
|---|---|---|
| 2000708 | 4/1990 | Canada . |
| 2000711 | 10/1994 | Canada . |

OTHER PUBLICATIONS

Czarnek et al., "Interferometric Measurements of Strain Concentrations Induced by an Optical Fiber Embedded in a Fiber Reinforced Composite," SPIE vol. 986, Fiber Optic Smart Structures and Skins, 1988, pp. 43–49.

Measures et al., "Structurally Integrated Fiber Optic Damage Assessment System for Composite Materials," SPIE vol. 986, Fiber Optic Smart Structures and Skins, 1988, pp. 120–129.

Udd, "Overview of Fiber Optic Smart Structures for Aerospace Applications, " SPIE vol. 986, Fiber Optic Smart Structures and Skins, 1988, pp. 2–5.

Rogowski et al., "Thermal Effects on Fiber Optic Strain Sensors Embedded in Graphite—Epoxy Resins," SPIE vol. 1170, Fiber Optic Smart Structures and Skins II, 1989, pp. 435–437.

(List continued on next page.)

*Primary Examiner*—Carl J. Arbes
*Attorney, Agent, or Firm*—Alston & Bird LLP

[57] ABSTRACT

The method of the present invention fabricates a plurality of composite structures so as to permit the reliable recovery of leads embedded within respective ones of the composite or smart structures. In this regard, the method of the present invention permits a plurality of composite structures to be fabricated, such as by means of a continuous pultrusion process, while enabling the leads to be recovered without interrupting the pultrusion process and without damaging the resulting composite structures. Correspondingly, a composite structure is provided according to the present invention which has a protective sleeve surrounding the portion of the lead which extends through the end of the composite body. As such, the protective sleeve protects the lead during the fabrication process by protecting the lead during the separation of the composite structures and the recovery of the embedded lead. In addition, the protective sleeve provides strain relief for the lead of the resulting composite structure and serves as a possible attachment point for a connector mounted upon an end portion of the resulting composite structure.

12 Claims, 2 Drawing Sheets

U.S. PATENT DOCUMENTS

| | | |
|---|---|---|
| 5,023,845 | 6/1991 | Crane et al. . |
| 5,044,203 | 9/1991 | Wiest et al. . |
| 5,084,221 | 1/1992 | Matsuno et al. . |
| 5,124,097 | 6/1992 | Malone . |
| 5,164,129 | 11/1992 | Douglas . |
| 5,212,755 | 5/1993 | Holmberg . |
| 5,240,643 | 8/1993 | Buckley et al. . |
| 5,245,180 | 9/1993 | Sirkis . |
| 5,285,569 | 2/1994 | Hoffa ........................................ 29/825 |
| 5,292,390 | 3/1994 | Burack et al. . |
| 5,293,683 | 3/1994 | Hoffa ........................................ 29/825 |
| 5,305,507 | 4/1994 | Dvorskey et al. . |
| 5,320,788 | 6/1994 | Schneider et al. . |
| 5,360,497 | 11/1994 | Schneider et al. . |
| 5,367,376 | 11/1994 | Lagakos et al. . |
| 5,375,485 | 12/1994 | Hoffa ..................................... 29/825 X |
| 5,399,854 | 3/1995 | Dunphey et al. . |
| 5,515,602 | 5/1996 | Hoffa ..................................... 29/828 X |
| 5,528,962 | 6/1996 | Hoffa ..................................... 29/825 X |
| 5,533,165 | 7/1996 | Burris et al. . |
| 5,540,870 | 7/1996 | Quigley . |
| 5,593,736 | 1/1997 | Cowen et al. . |
| 5,594,819 | 1/1997 | Narendran et al. . |
| 5,626,700 | 5/1997 | Kaiser . |
| 5,630,341 | 5/1997 | Hoffa ..................................... 29/825 X |
| 5,650,109 | 7/1997 | Kaiser . |
| 5,664,324 | 9/1997 | Hoffa et al. ............................... 29/825 |
| 5,678,302 | 10/1997 | Miyadai et al. . |

OTHER PUBLICATIONS

Jensen and Pascual, "Degradation of Graphite/Bismaleimide Laminates with Multiple Embedded Fiber—Optic Sensors," SPIE vol. 1370, Fiber Optic Smart Structures and Skins III, 1990, pp. 228–237.

Talat, "Smart Skins and Fiber—Optic Sensors Application and Issues," SPIE vol. 1370, Fiber Optic Smart Structures and Skins III, 1990, pp. 103–114.

Friebele et al., Distributed Strain Sensing with Fiber Bragg Grating Arrays Embedded in CRTM Composites, SPIE vol. 2361, 2nd European Conference on Smart Structures and Materials, 1994, pp. 338–341.

Levin and Nilsson, "Analysis of the Local Stress Field in a Composite Material with an Embedded EFPI—Sensor," SPIE vol. 2361, 2nd European Conference on Smart Structure and Materials, 1994, pp. 379–382.

Friebele et al., "Demonstration of Distributed Strain Sensing in Production Scale Instrumented Structures," Spie vol. 2721, 1996, pp. 118–124.

Kalamkarov et al., "Pultrusion of Smart FRP Composites," SPIE vol. 3042, 1997, pp. 440–409.

Kalamkarov et al., "Experimental Applications of Smart Composites," SPIE vol. 2921, 1997, pp. 410–418.

Krishnamoorthy and Belarbi, "Hybrid Composite Rebars for Smart Composite Structures," SPIE vol. 3043, Smart Systems for Bridges, Structures and Highways, 1997, pp. 65–69.

METHOD FOR RECOVERING LEADS EMBEDDED WITHIN A COMPOSITE STRUCTURE

FIELD OF THE INVENTION

The present invention relates generally to methods for fabricating composite or smart structures and, more particularly, to methods for recovering leads embedded within a composite structure as well as the resulting composite or smart structures.

BACKGROUND OF THE INVENTION

Composite structures are utilized in a wide variety of applications. In recent years, the variety of applications which utilize composite structure has increased as applications for composite technology have expanded from the aerospace industry to the civil, construction, marine and transportation industries. With respect to civil engineering applications, for example, composite structures have been utilized as prestressing tendons, as reinforcing bars and, most recently, as structural members of bridges that are either being newly constructed or are being rehabilitated.

In addition, an increasing number of composite structures are designed to be smart structures by including one or more electrical or optical devices. In order to permit communication with the embedded device, these smart structures also generally include one or more leads embedded within and extending outwardly from the composite structure. As used herein, leads include electrical leads or wires, optical fibers and other leads or cables having a relatively small diameter in comparison to the dimensions of the composite structure within which the lead is embedded.

For example, composite structures and, more particularly, those composite smart structures designed for civil engineering applications may include one or more sensors. In this regard, composite structures can include a variety of electrical and/or optical sensors for measuring a variety of physical phenomena. For example, the embedded sensors can measure the strain exerted upon a composite structure. In particular, the embedded sensors can be designed to measure the residual stress and strain in composite structures arising from the manufacturing process and the interaction between the reinforcing fibers and the surrounding matrix. However, the embedded sensors can also be designed to measure the stress and strain imparted to the composite structure following its installation. For example, composite structures having embedded sensors can be utilized to construct a bridge such that the embedded sensors measure the deformation of the bridge.

Since composite structures are increasingly being utilized in larger quantities, it is desirable to mass produce the composite structures so as to reduce the manufacturing costs and the time required for manufacture of the composite structures. As such, at least some composite structures are pultruded. For example, the rods, bars and other elongated members utilized in a variety of civil engineering applications, such as bridge construction, can be readily pultruded.

As known to those skilled in the art, a conventional pultrusion process wets the fibers with a resin prior to pulling the wet fibers through a heated die which cures the resin to form the resulting composite structure. Advantageously, the pultrusion of composite structures can be performed as a continuous process such that a number of composite structures are formed in a serial fashion, thereby further increasing the efficiency with which the composite structures are fabricated. As will be apparent, the plurality of interconnected composite structures must then be separated or cut into individual composite structures following the pultrusion process. While the separation of the composite structures following the pultrusion process is generally straight-forward, the separation of composite structures that include leads, such as electrical wires or optical fibers, is significantly more complicated since the leads must also be recovered following the separation of the composite structures.

Most attempts to recover the leads embedded within a pultruded composite structure by machining the end or edge portion of the composite structure have damaged either the composite structure, the leads or both. As a result, resin starvation techniques, such as described in more detail by U.S. Pat. No. 4,347,287 to Armand F. Lewis, et al., which issued Aug. 31, 1982, have been developed which alter the general pultrusion process by periodically removing the resin such that the resulting product includes a number of fully formed composite structures separated by sections of dry fibers. As will be apparent, once the resulting composite structures have been separated, the leads can be readily recovered from the sections of dry fiber.

Unfortunately, pultrusion processes that utilize resin starvation have difficulty forming composite structures of a predetermined length since resin that has been previously supplied will wet the fibers and create a solid part for a period of time following the removal of the resin. As such, pultrusion processes which utilize resin starvation can typically only form composite structures having lengths that are within +/+30 cm of a desired length. Since composite parts are generally manufactured to tolerances of, at most, +/−1 cm in length, pultrusion processes that utilize resin starvation are generally not acceptable.

In addition, pultrusion processes that utilize resin starvation typically create composite structures having end portions with a tapered shape since the fibers which form the outer portions of the composite structure dry prior to the fibers within the interior of the composite structure. Thus, the resulting composite structure has a rather unfinished appearance since the end portions are not square. Further, pultrusion processes which utilize resin starvation never operate in a steady state for very long since the resin is intermittently removed from the pultrusion process, thereby inhibiting proper quality control and potentially degrading the ultimate mechanical properties of the resulting composite structures.

Furthermore, the leads are not protected within the sections of dry fibers. Thus, the pulling and/or gripping mechanism which advances the composite structure along the pultrusion fabrication line can damage the leads. Since the leads oftentimes permit communication within embedded devices, such as sensors and/or actuators, any damage to the lead may also prevent effective communication with the embedded devices. Because the embedded devices are generally relatively expensive, the costs of the resulting pultruded composite structure will therefore be increased even though communication cannot be established with the embedded sensors and/or actuators.

While it is advantageous in many applications to embed devices and their associated leads within composite structures, it is sometimes difficult to recover the leads following the fabrication of composite structure. In this regard, even though pultrusion is an efficient process by which to fabricate a plurality of composite structures, the continuous nature of the pultrusion process makes it even more difficult to recover leads which are embedded within the resulting composite structures. Even though resin starvation can be utilized in order to create sections of dry fibers from which the leads can be readily recovered, pultrusion processes which utilize resin starvation still suffer from a number of deficiencies as described above.

SUMMARY OF THE INVENTION

The present invention therefore provides a method for fabricating a plurality of composite structures and for reliably recovering the leads embedded within respective ones of the composite structures. In one advantageous embodiment, for example, the method of the present invention permits a plurality of composite structures to be fabricated, such as by means of a continuous pultrusion process, while enabling the leads to be recovered in a manner which does not disrupt the pultrusion process and does not damage the resulting composite structures. Correspondingly, the present invention provides a composite structure having a protective sleeve surrounding the portion of the lead which extends through the end of the composite body. As described below, the protective sleeve protects the lead during the fabrication process by protecting the lead during the separation of the composite structures and the recovery of the embedded lead. In addition, the protective sleeve provides strain relief for the lead of the resulting composite structure.

According to one advantageous embodiment of the present invention, a method for fabricating a plurality of composite structures is provided which permits leads to be embedded within and subsequently recovered from the composite structures so as to extend from respective ends of the composite structures. According to this advantageous method, a plurality of protective sleeves are disposed in a spaced apart relationship about respective portions of the leads. The plurality of composite structures are then formed, such as by pultrusion, about the leads, such that the leads and the plurality of protective sleeves are embedded within the plurality of composite structures. The plurality of interconnected composite structures are then separated to form a plurality of discrete composite structures, each of which has a lead extending from at least one end. According to the present invention, the composite structures are separated such that the protective sleeves surround the portions of the leads that extend from respective ends of the composite structures so as to protect the leads during the separation of the interconnected composite structures.

In order to separate the interconnected composite structures, a cut is initially made completely through the composite structures and the embedded leads at a first cut location. Thereafter, the composite structure is cut at a second cut location spaced from the first cut location to define the end of the resulting composite structure and to form a composite plug surrounding an end portion of the lead. In cutting the composite structure at the second cut location, the cut is terminated upon reaching the protective sleeve that surrounds the lead such that the protective sleeve is not completely severed. The resulting intermediate composite structure having a composite plug surrounding the portion of the lead that extends beyond the end of the composite structure can then be shipped or otherwise handled since the composite plug at least partially protects the lead. Thereafter, the composite plug can be removed, such as by sliding the composite plug over the protective sleeve and the lead, such that the end portion of the lead extends beyond the end of the resulting composite structure defined by the second cut location. As a result, the method of this advantageous embodiment of the present invention provides a reliable technique for recovering leads embedded within a composite structure, even if the composite structure were formed by means of a pultrusion or other continuous type of fabrication process which produces a number of interconnected composite structures.

In order to separate the interconnected composite structures, the locations of the protective sleeves are initially identified such that the interconnected composite structures can be cut at first cut locations corresponding to those locations at which the protective sleeves surround the embedded lead. As a result, any cut completely through the composite structure at a first cut location will also cut through a protective sleeve. While the protective sleeve can surround the entire end portion of the lead that extends beyond the respective end of the composite structure, an end portion of the protective sleeve is generally removed once the composite plug has been removed so that the end portion of the lead also extends beyond the protective sleeve. By extending beyond the end of the composite structure by some distance, however, the protective sleeve provides strain relief for the lead.

During the process of fabricating a plurality of composite structures, a device delivery package can be formed by connecting the respective leads of a plurality of devices, such as sensors and/or actuators. Once the protective sleeves have been disposed in a spaced apart relationship about the leads, such as about respective points of connection between the leads of the plurality of device, the device delivery package can be embedded within the plurality of composite structures. Once the composite structures have been separated and the leads have been recovered, communication can be established with the embedded devices by means of the recovered leads. The resulting composite structures can therefore serve as smart structures which permit data, such as the stress and strain imparted upon the composite structures, to be measured and analyzed.

Accordingly, the method of the present invention fabricates a plurality of composite structures having embedded leads and, in many instances, embedded sensors and/or actuators in a manner which permits the composite structures to be separated into a plurality of discrete composite structures and allows the embedded leads to be readily recovered without interrupting the fabrication process and without damaging the resulting composite structures. Therefore, the efficiency of the resulting fabrication process, such as a continuous pultrusion process, is improved. In addition, the yield rate of the resulting fabrication process is also increased since the embedded leads can be readily recovered from the composite structures without altering the fabrication process in the manner which would adversely affect the resulting composite structures. Furthermore, the composite structures produced according to the present invention include a protective sleeve extending beyond the end of the composite structure so as to not only protect the lead during recovery of the lead, but also to provide strain relief for the lead.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

According to the present invention, a method is provided for recovering leads embedded within a composite structure. Although the composite structure can be fabricated in a variety of fashions, the method of the present invention is particularly advantageous for recovering leads embedded within a composite structure that was fabricated by a continuous fabrication process, such as a pultrusion process, since conventional techniques for recovering leads embedded within composite structures fabricated by a continuous fabrication process suffer from a number of deficiencies as previously described.

Figure 1:
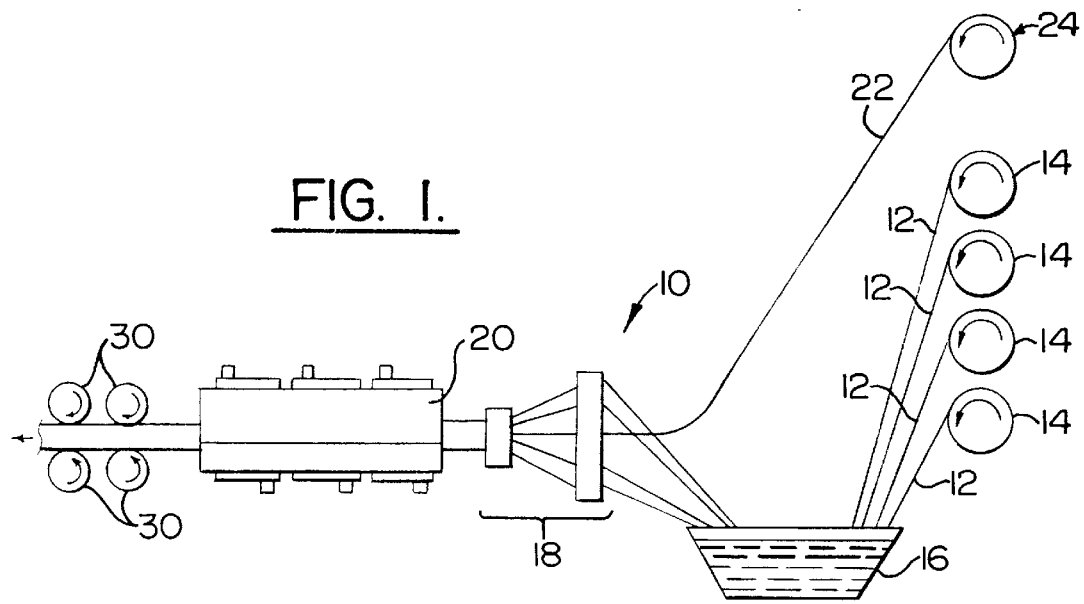
FIG. 1 is a schematic representation of a pultrusion manufacturing line.

One example of a continuous fabrication process is a pultrusion fabrication line 10 as schematically represented in FIG. 1. As shown, the pultrusion fabrication line generally receives a number of relatively continuous fibers or filaments 12 that are drawn from reels 14, roving creels or the like. The fibers can be formed of a variety of materials depending upon the desired properties of the resulting composite structures. For example, the fibers can be formed of carbon, glass, boron, synthetic materials, such as aramid, or hybrids thereof. While all of the fibers are generally formed of the same material, the fibers can be formed of different materials, if so desired. As also shown in FIG. 1, the fibers are generally oriented in a parallel fashion so as to provide tensile strength along the longitudinal axis of the resulting composite structure. However, a multidirectional reinforcement, such as a fabric or a mat, may be added to the composite structure in order to increase its transverse strength.

As shown in FIG. 1, the pultrusion fabrication line 10 passes the fibers 12 through a resin bath 16 so as to impregnate the fibers with a matrix material. Typically, the matrix material is a thermosetting or thermoplastic resin. However, a variety of other matrix materials can be utilized as known to those skilled in the art without departing the skill and scope of the present invention.

As shown in FIG. 1, the pultrusion fabrication line 10 then draws the wet fibers through a fiber feed card system 18 which eliminates excess resin and which preforms the fibers into a shape which reasonably approximates the shape of the resulting composite structure. The pultrusion fabrication line then draws the wet, preshaped fibers into an elongated die 20 having an internal cavity which is shaped to define the shape of the resulting composite structures. Although the die can be formed of a variety of materials, the die is typically formed of steel. As known to those skilled in the art, the die is heated, such as by means of electric strip heaters so as to cure the matrix material within the die.

Along with the wet fibers, the method of the present invention preferably feeds one or more leads 22 into the heated die 20 via a suitably positioned hole such that the leads become embedded in the desired location in the resulting composite structures. As described above, the leads can be electrical leads or wires, optical fibers or the like. The leads can therefore be embedded within and can extend through the resulting composite structure so as to provide a communications path through the composite structure. Alternatively, the leads can extend between a plurality of sensors and/or actuators 26 to form a device delivery package 24 which is fed into the heated die and embedded within the composite structures. In either instance, the leading or front end of the device delivery package can have an excess length of lead or the first lead can be attached to a short length of filament 12 to allow the first device of the device delivery package to be pulled through and correctly positioned within the first composite structure.

Figure 2A:
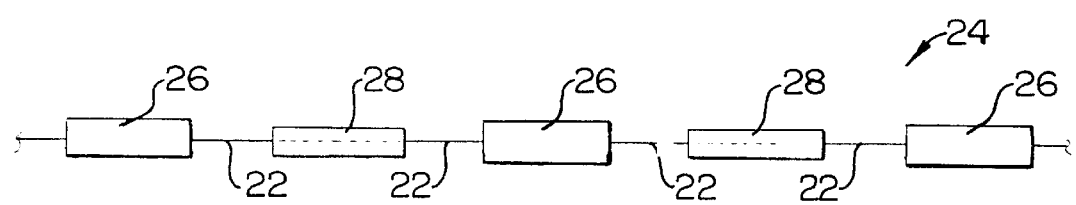
FIG. 2a is a schematic representation of a device delivery package including a plurality of interconnected sensors and/or actuators and a plurality of protective sleeves disposed about the respective points of connection of the leads extending between the plurality of sensors.

As shown in FIG. 2a, the device delivery package 24 preferably includes a number of sensors and/or actuators 26 having leads 22 extending therefrom. For example, the device delivery package can include a variety of sensors, including both electrical and optical sensors. In addition, the device delivery package can include sensors or actuators that are designed to measure or produce a variety of different physical phenomena, such as stress, strain, temperature, etc. As described below, the leads of the various sensors and/or actuators are connected, either directly from lead-to-lead or indirectly via one or more protective sleeves 28, to form the chain of sensors and/or actuators which comprises the device delivery package.

As shown in FIG. 2a, the device delivery package 24 also includes protective sleeves 28 disposed about respective portions of the leads 22 in a spaced apart relationship. Although the protective sleeves can be disposed about different portions of the leads, the protective sleeves are generally disposed about the end portions of the leads such that a single protective sleeve receives and protects the end portions of the leads that extend outwardly from each of a pair of adjacent devices 26. In addition, the protective sleeves are spaced apart by the length of the respective composite structures so as to be located proximate the end portions of the resulting composite structures.

The protective sleeves 28 can be formed of a variety of materials. As explained in detail below, the protective sleeves are preferably formed of a material that can withstand the temperatures and pressures to which the composite structures are subjected during the fabrication process. For example, during a pultrusion process, the composite structures are typically subjected to temperatures between 110°

C. and 300° C. and pressures of between 10 psi and 300 psi within the heated die 20. The protective sleeves should also be formed of a material which does not strongly adhere to and which therefore readily releases from the surrounding composite material once the composite material has cured. Additionally, the protective sleeves should be formed of a material that is sufficiently tough and sufficiently thick so as to protect the leads 22 from being cut during the process of separating the composite structures and recovering the leads as described below. Finally, the dimensions of the protective sleeve should be relatively small in comparison to the cross-sectional dimensions of the resulting composite structures such that the protective sleeves do not interfere with the fabrication process.

For example, the protective sleeve 28 can be formed of a metal tube, a polymer tube, a silicone tube or a glass tube. For a protective sleeve formed of silicone, the sleeve can have an outer diameter of 0.030 inch, an inner diameter of 0.010 inch and a length of 24 inches. However, the protective sleeve can be formed of other materials and can have other dimensions without departing from the spirit and scope of the present invention.

The opposed ends of the protective sleeve 28 are preferably attached to the respective leads 22, such as by means of an epoxy or other adhesive, so as to thereby indirectly connect the leads. In addition to the indirect connection of the leads provided by the protective sleeve, the respective leads can also be connected directly to one another, if so desired.

Figure 2B:
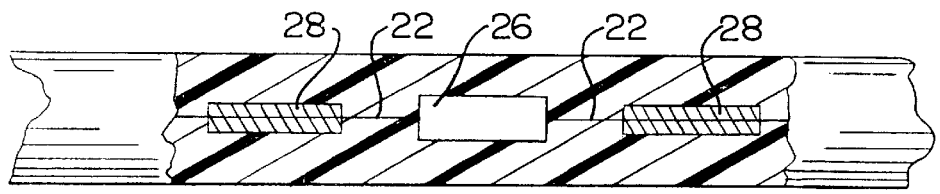
FIG. 2b is a fragmentary cross-sectional representation of a portion of the device delivery package embedded within a plurality of composite structures following a pultrusion process.

Typically, the sensors and/or actuators 26 of the device delivery package 24 are spaced such that at least one device will be embedded within each composite structure during the fabrication process, i.e., during the pultrusion process. In this regard, a plurality of interconnected composite structures, each having an embedded sensor and/or actuator 26, are schematically depicted in FIG. 2b. As described above, however, composite structures can be fabricated according to the method of the present invention which include one or more leads 22 extending therethrough for providing communications, typically either electrical or optical communications, without embedding a sensor or actuator within the respective composite structure.

Once the composite structures have been advanced through the die 20, such as by means of the roller mechanism 30 illustrated in FIG. 1, the plurality of interconnected composite structures can be separated to form a plurality of discrete composite structures or parts. In this regard, the plurality of composite structures are separated by cutting completely through the composite structures and the embedded leads 22 at one or more first cut locations 32. In order to properly separate the composite structures, the interconnected composite structures should be cut between each pair of adjacent composite structures.

In order to recover the embedded leads 22, the location of the cuts separating the plurality of interconnected composite structures are preferably selected such that the cuts extend through respective ones of the protective sleeves 28. Typically, the protective sleeves are located by tracking or identifying the relative positions of the protective sleeves and the spacing between the protective sleeves as the device delivery package 24 enters the heated die 20. By correctly positioning the protective sleeves within the composite structures in a predefined manner during production, the composite structures can be separated at first cut locations 32 at which the protective sleeves surround the embedded leads such that the protective sleeves are also severed at the first cut locations. See, for example, FIGS. 2c and 3a. Although the composite structures can be cut with a number of different cutting tools, any suitable fine toothed saw device, such as an electric jigsaw, can be utilized to cut the interconnected composite structures at the first cut locations.

Figure 2C:
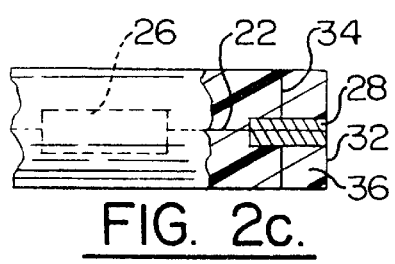
FIG. 2c is a fragmentary cross-sectional representation of a single composite structure following cutting of the composite structure at the first and second cutting locations and prior to removal of the composite plug.
Figure 3A:
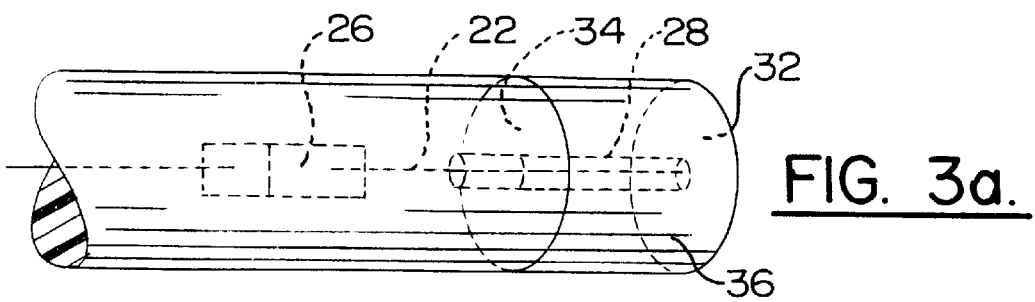
FIG. 3a is a fragmentary perspective view of the composite structure of FIG. 2c following cutting of the composite structure at the first and second cutting locations and prior to removal of the composite plug.

As also shown in FIGS. 2c and 3a, each discrete composite structure is thereafter cut at a second cut location 34, spaced from the first cut location 32, to form a composite plug 36 surrounding an end portion of the lead 22. In cutting the composite structure at the second cut location, the cutting of composite structure is preferably terminated upon reaching the protective sleeve 28 that surrounds the lead such that the protective sleeve is not completely severed. In this regard, any fine toothed manual or small power-driven saw can be utilized to cut the composite structure at the second cut location so as to cut the relatively rigid composite material while not cutting the relatively flexible protective sleeve surrounding the respective lead. With respect to a fine toothed saw, the operator can feel when the saw has reached or has contacted the sleeve and can thereafter move or rotate the composite structure prior to severing the sleeve. When producing production quantities of composite structures according to the present invention, however, a simple depth type former, gauge or cutting guide can be used to guide and limit this second cut such that the operator does not sever or otherwise damage the protective sleeve or the lead extending through the protective sleeve.

Although the distance between the first and second cut locations can vary depending upon the spacing between adjacent composite structures, the second cut location 34 is preferably selected so as to form one end of the resulting composite structure. In addition, although the recovery of a lead 22 is illustrated and described in conjunction with only one end of the composite structure, leads can be recovered from either one or both ends of the composite structure according to the method of the present invention, if so desired.

Although the composite structure illustrated in FIG. 2c is merely an intermediate stage in the overall fabrication process, this intermediate composite structure provides several advantages. In particular, the composite plug 36 that surrounds the portion of the lead 22 that extends beyond the end of the composite structure serves to protect the lead from breakage or other damage, such as during transportation or handling. As such, the composite plug can remain in place until the composite structure has been shipped and is ready for installation.

Figure 2D:
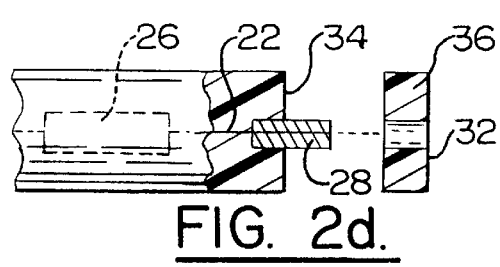
FIG. 2d is a fragmentary cross-sectional representation of a composite structure of FIG. 2c following removal of the composite plug.
Figure 2E:
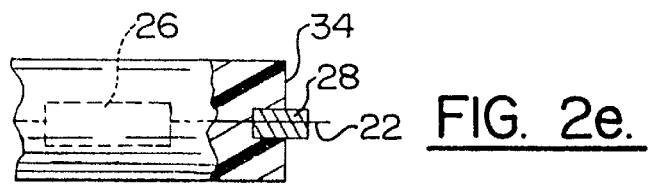
FIG. 2e is a fragmentary cross-sectional representation of the composite structure of FIGS. 2c and 2d following removal of an end portion of the protective sleeve.
Figure 3B:
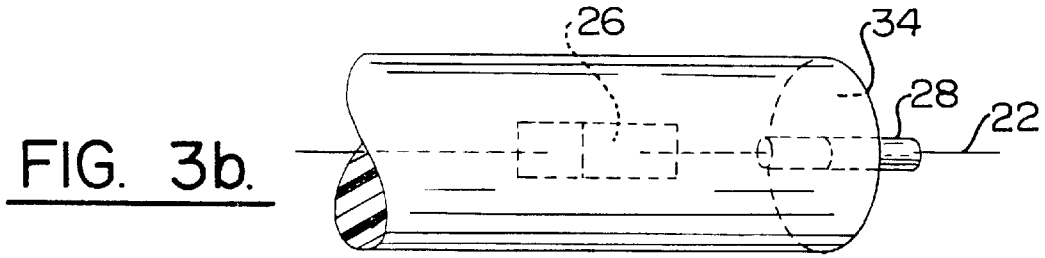
FIG. 3b is a fragmentary perspective view of the composite structure of FIG. 2e following removal of an end portion of the protective sleeve.

As shown in FIG. 2d, the composite plug 36 is eventually removed such that the end portion of the lead 22 extends beyond the end of the composite structure defined by the second cut location 34. Preferably, the composite plug is slidably removed since the protective sleeve 28 is preferably formed of a material which does not strongly adhere to the surrounding composite material. As shown in FIGS. 2e and 3b, an end portion of the protective sleeve can be subsequently removed such that the end portion of the lead extends not only beyond the end of the composite structure, but also beyond the protective sleeve. As such, a connector can be readily mounted upon the portion of the lead which extends beyond the end of the composite structure for facilitating subsequent communication with an embedded sensor or actuator 26.

In this regard, the portion of the protective sleeve 28 left embedded in the end of the composite structure can also serve as the anchor point for the connector itself, thus preserving the full structural integrity of the composite structure itself while potentially strengthening the end of the composite structure by filling in the sleeve. For example, a screw-threaded connector or a glue-in type tubular connector can be inserted and anchored within the sleeve with the lead connected to or extending through the connector. In addition, a connector having an expandable end can be inserted into the sleeve and expanded to secure the connector to the end of the composite structure without glue or a threaded connection.

As shown in FIGS. 2e and 3b, the resulting composite structure advantageously includes the remaining portion of the protective sleeve 28 with a first end of the protective sleeve embedded within the body of the composite structure and a second end extending beyond the respective end of the composite structure. Since the lead 22 extends through the protective sleeve, the protective sleeve provides strain relief for the lead as the lead is moved relative to the body of the composite structure.

Accordingly, the method of the present invention fabricates a plurality of composite structures having embedded leads 22 and, in many instances, embedded sensors and/or actuators 26 in a manner which permits the composite structures to be separated into a plurality of discrete composite structures and allows the embedded leads to be readily recovered without interrupting the fabrication process and without damaging the resulting composite structures. Therefore, the efficiency of the resulting fabrication process, such as a continuous pultrusion process, is improved. In addition, the yield rate of the resulting fabrication process is also increased since the embedded leads can be readily recovered from the composite structures without altering the fabrication process in the manner which would adversely affect the resulting composite structures. Furthermore, the composite structures produced according to the present invention advantageously include a protective sleeve 28 extending beyond the end of the composite structure so as to not only protect the lead during recovery of the lead, but also to provide strain relief for the lead.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A method for recovering leads embedded within a composite structure comprised of a plurality of fibers embedded within a matrix material, wherein the method comprises the steps of:

cutting completely through the composite structure and the embedded lead at a first cut location;

cutting into the composite structure at a second cut location spaced from the first cut location to thereby form a composite plug surrounding an end portion of the lead, wherein said step of cutting at the second cut location comprises:
  selecting the second cut location to coincide with a protective sleeve that surrounds the lead, wherein the protective sleeve surrounds only a portion of the lead such that the lead extends outwardly beyond at least one end of the protective sleeve; and
  terminating said cutting step upon reaching the protective sleeve that surrounds the lead such that the protective sleeve is not completely severed; and removing the composite plug such that the end portion of the lead and the surrounding protective sleeve extend beyond the end of the composite structure defined by the second cut location.

2. A method according to claim 1 wherein said removing step comprises slidably advancing the composite plug over the protective sleeve and the end portion of the lead in a direction away from the composite structure.

3. A method according to claim 2 further comprising the step of removing an end portion of the protective sleeve following said composite plug removing step such that the end portion of the lead also extends beyond the protective sleeve.

4. A method according to claim 1 further comprising the step of selecting the first cut location based at least partially upon the position of the protective sleeve within the composite structure prior to said cutting steps.

5. A method according to claim 1 wherein said step of cutting at the first cut location comprises cutting completely through the composite structure at a location at which the protective sleeve surrounds the embedded lead such that the protective sleeve is also cut completely through at the first cut location.

6. A method for fabricating a plurality of composite structures comprised of a plurality of fibers embedded within a matrix material, wherein each composite structure includes a lead extending from at least one end, and wherein the method comprises the steps of:

disposing a plurality of protective sleeves about respective portions of the lead, wherein said disposing step comprises spacing the protective sleeves apart along the lead;

forming the plurality of composite structures about the lead such that the lead and the plurality of protective sleeves are embedded within the plurality of composite structures, wherein the plurality of composite structures are interconnected following said forming step; and separating the plurality of interconnected composite structures to form a plurality of discrete composite structures having leads extending from the ends thereof, wherein said separating step comprises selecting respective locations at which the plurality of interconnected composite structures are to be separated to coincide with the spaced apart protective sleeves such that the lead extending from at least one end of each discrete composite structure is surrounded by a protective sleeve, and wherein the protective sleeves protect the leads extending from the ends of the respective composite structures during said separating step.

7. A method according to claim 6 wherein said forming step comprises pultruding the plurality of interconnected composite structures about the lead, wherein said pultruding step comprises:

impregnating the plurality of fibers with the matrix material;

shaping the impregnated fibers into a predetermined shape around the lead;

curing the matrix material; and pulling the plurality of fibers along a pultrusion fabrication line while performing said impregnating, shaping and curing steps.

8. A method according to claim 6 wherein said separating step comprises cutting completely through the interconnected composite structures and the embedded lead at a first cut location positioned between adjacent composite structures.

9. A method according to claim 8 further comprising the step of cutting into a respective one of the discrete composite structures at a second cut location spaced interior of the first cut location to thereby form a composite plug surrounding an end portion of the lead, wherein said step of cutting at the second cut location comprises terminating said cutting step upon reaching the protective sleeve that surrounds the lead such that the protective sleeve is not completely severed.

10. A method according to claim 9 further comprising the step of removing the composite plug such that the end portion of the lead extends beyond the end of the respective composite structure defined by the second cut location.

11. A method according to claim 6 further comprising the step of connecting respective leads of a plurality of devices to thereby form a device delivery package, wherein said forming step comprises forming the plurality of composite structures about the device delivery package such that the device delivery package is embedded therein.

12. A method according to claim 11 wherein said disposing step comprises disposing the plurality of protective sleeves about respective points of connection between the leads of the plurality of devices.

* * * * *